(12) United States Patent
Yokoyama

(10) Patent No.: US 10,377,884 B2
(45) Date of Patent: Aug. 13, 2019

(54) RUBBER COMPOSITION FOR TYRES, AND PNEUMATIC TYRE

(71) Applicant: SUMITOMO RUBBER INDUSTRIES, LTD., Kobe-shi, Hyogo (JP)

(72) Inventor: Yuka Yokoyama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days.

(21) Appl. No.: 15/549,049

(22) PCT Filed: Feb. 15, 2016

(86) PCT No.: PCT/JP2016/054214
§ 371 (c)(1),
(2) Date: Aug. 4, 2017

(87) PCT Pub. No.: WO2016/133029
PCT Pub. Date: Aug. 25, 2016

(65) Prior Publication Data
US 2018/0030250 A1    Feb. 1, 2018

(30) Foreign Application Priority Data

Feb. 19, 2015  (JP) ................................. 2015-030856

(51) Int. Cl.
| | |
|---|---|
| *C08L 9/06* | (2006.01) |
| *B60C 1/00* | (2006.01) |
| *C08K 3/36* | (2006.01) |
| *C08K 5/548* | (2006.01) |
| *C08L 15/00* | (2006.01) |

(52) U.S. Cl.
CPC ........ *C08L 9/06* (2013.01); *B60C 1/00* (2013.01); *B60C 1/0016* (2013.01); *C08K 3/36* (2013.01); *C08K 5/548* (2013.01); *C08L 15/00* (2013.01); *C08L 2205/02* (2013.01)

(58) Field of Classification Search
CPC ........ C08L 9/06; C08L 2205/02; B60C 1/0016
See application file for complete search history.

(56) References Cited

U.S. PATENT DOCUMENTS

| | | | |
|---|---|---|---|
| 2008/0161452 A1 | 7/2008 | York et al. | |
| 2008/0161459 A1 | 7/2008 | Cruse et al. | |
| 2008/0161460 A1 | 7/2008 | York et al. | |
| 2008/0161461 A1 | 7/2008 | Cruse et al. | |
| 2008/0161462 A1 | 7/2008 | York et al. | |
| 2008/0161463 A1 | 7/2008 | Cruse et al. | |
| 2008/0161475 A1 | 7/2008 | York et al. | |
| 2008/0161477 A1 | 7/2008 | Cruse et al. | |
| 2014/0051792 A1* | 2/2014 | Horie ............... | C08K 3/04 |
| | | | 524/493 |

FOREIGN PATENT DOCUMENTS

| | | | |
|---|---|---|---|
| JP | 2010-514765 A | 5/2010 | |
| JP | 2010-514766 A | 5/2010 | |
| JP | 2010-514896 A | 5/2010 | |
| JP | 2010-514897 A | 5/2010 | |
| JP | 2010-514907 A | 5/2010 | |
| JP | 2012-82325 A | 4/2012 | |
| JP | 2013-227452 | * 11/2013 | .............. C08L 21/00 |
| JP | 2013-227452 A | 11/2013 | |
| JP | 2014-12750 A | 1/2014 | |

OTHER PUBLICATIONS

Machine translation of JP-2013-227452-A, published Nov. 7, 2013.
Machine translation of JP-2014-12750-A, published Jan. 23, 2014.
International Search Report issued in PCT/JP2016/054214 (PCT/ISA/210), dated May 17, 2016.
Written Opinion of the International Searching Authority issued in PCT/JP2016/054214 (PCT/ISA/237), dated May 17, 2016.

* cited by examiner

*Primary Examiner* — Robert D Harlan
(74) *Attorney, Agent, or Firm* — Birch, Stewart, Kolasch & Birch LLP

(57) ABSTRACT

Provided are a rubber composition for tires that shows a balanced improvement in fuel economy, abrasion resistance, wet performance, and handling stability, and a pneumatic tire formed from the rubber composition. The present invention relates to a rubber composition for tires containing a modified diene rubber containing a functional group reactive with silica, a fine particle silica having a nitrogen adsorption specific surface area of 180 $m^2/g$ or more, and a silane coupling agent represented by a specific formula.

9 Claims, No Drawings

RUBBER COMPOSITION FOR TYRES, AND PNEUMATIC TYRE

TECHNICAL FIELD

The present invention relates to a rubber composition for tires and a pneumatic tire.

BACKGROUND ART

In response to the recent demand for fuel efficient tires, rubber compositions incorporating silica have been used in treads and various other tire components. Silica, on the surface of which there are hydrophilic silanol groups, shows lower affinity for the rubber components, particularly natural rubber, polybutadiene rubber, styrene-butadiene rubber, and other rubbers generally used in tires, than carbon black, and thus tends to provide inferior abrasion resistance and mechanical strength (e.g. tensile strength, elongation at break).

Many techniques for solving the above problem have been proposed, such as for example introducing a modifying group reactive with silica into a rubber component, or using a silane coupling agent to enhance the interaction between a rubber component and silica. However, common silane coupling agents have only a limited effect on dispersion of silica because, unfortunately, the functional groups in the molecules react with each other and aggregate before the reaction with silica. Patent Literature 1 discloses the use of a highly reactive mercapto silane coupling agent and the combined use of silane coupling agents. These methods still have room for improvement in terms of fuel economy, rubber strength, handling stability, wet performance, and other properties.

Moreover, not only fuel economy but also abrasion resistance are demanded these days from the standpoint of protection of resources. Thus, the use of fine particle silica having high reinforcing properties has been proposed. However, fine particle silica is usually very difficult to disperse in rubber compositions and cannot be dispersed well. As a result, unfortunately, aggregates are left, and thus abrasion resistance and mechanical strength cannot be greatly improved, or physical properties may even deteriorate in some cases. Such problems are more likely to occur especially with polymers having functional groups introduced therein because these polymers themselves also have poor processability. Therefore, there is a need for techniques that achieve a balanced improvement in properties including fuel economy, abrasion resistance, wet performance, and handling stability.

CITATION LIST

Patent Literature

Patent Literature 1: JP 2012-82325 A

SUMMARY OF INVENTION

Technical Problem

The present invention aims to solve the above problems and provide a rubber composition for tires that shows a balanced improvement in fuel economy, abrasion resistance, wet performance, and handling stability, as well as a pneumatic tire formed from the rubber composition.

Solution to Problem

The present invention relates to a rubber composition for tires, containing:
a modified diene rubber containing a functional group reactive with silica;
a fine particle silica having a nitrogen adsorption specific surface area of 180 m²/g or more; and
a silane coupling agent represented by the following formula (1):

wherein each $G^1$ independently represents a C1-C30 polyvalent hydrocarbon group containing a polysulfide group, represented by $[(CH_2)_b—]_c R^4[—(CH_2)_d S_x—]_e$;

each $G^2$ independently represents a C1-C30 polyvalent hydrocarbon group containing a polysulfide group, represented by $[(CH_2)_b—]_c R^5[—(CH_2)_d S_x—]_e$;

each of $Y^1$ and $Y^2$ independently represents a silyl group represented by $—SiX^1X^2X^3$, a hydrogen atom, a carboxyl group, or an ester group represented by $—C(=O)OR^6$;

each $X^1$ independently represents $—Cl$, $—Br$, $—OH$, $—OR^6$, or $R^6C(=O)O—$;

each of $X^2$ and $X^3$ independently represents a hydrogen atom, $R^6$, $X^1$, or a $—OSi$-containing group formed by silanol condensation;

each of $R^1$ and $R^3$ independently represents a C1-C20 divalent hydrocarbon group;

each $R^2$ independently represents a linear hydrocarbon group represented by $—(CH_2)_f—$;

each $R^4$ independently represents a C1-C28 polyvalent hydrocarbon group or a heteroatom-containing C1-C27 polyvalent hydrocarbon group;

each $R^5$ independently represents a C1-C28 polyvalent hydrocarbon group;

$R^6$ represents a C1-C20 monovalent hydrocarbon group; and a, b, c, d, e, f, m, n, o, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, o represents a number of 0 to 10, and x represents a number of 1 to 10.

The fine particle silica is preferably present in an amount of 5 parts by mass or more per 100 parts by mass of a rubber component in the rubber composition.

The silane coupling agent of formula (1) is preferably a compound represented by the following formula:

wherein each of $Y^1$ and $Y^2$ independently represents a silyl group represented by $—SiX^1X^2X^3$, a hydrogen atom, a carboxyl group, or an ester group represented by $—C(=O)OR^6$;

each $X^1$ independently represents $—Cl$, $—Br$, $—OH$, $—OR^6$, or $R^6C(=O)O—$;

each of $X^2$ and $X^3$ independently represents a hydrogen atom, $R^6$, $X^1$, or a $—OSi$-containing group formed by silanol condensation;

each of $R^1$ and $R^3$ independently represents a C1-C20 divalent hydrocarbon group;

each $R^2$ independently represents a linear hydrocarbon group represented by $—(CH_2)_f—$;

each $R^4$ independently represents a cyclic alkyl, alkenyl, alkynyl, aryl, or aralkyl group in which a+c+e−1 hydrogen atoms have been replaced;

$R^6$ represents a C1-C20 monovalent hydrocarbon group; and a, b, c, d, e, f, m, n, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, and x represents a number of 1 to 10.

The modified diene rubber containing a functional group reactive with silica preferably contains at least two selected from the group consisting of a silyl group, an amino group, an amide group, a hydroxy group, and an epoxy group.

The rubber composition preferably further contains at least one selected from the group consisting of surfactants, liquid coumarone-indene resins, and aluminum hydroxide.

The present invention also relates to a pneumatic tire, formed from the rubber composition.

Advantageous Effects of Invention

The rubber composition for tires of the present invention contains a modified diene rubber containing a functional group reactive with silica, a fine particle silica having a nitrogen adsorption specific surface area of 180 m²/g or more, and a silane coupling agent of formula (1), to thereby achieve a balanced improvement in fuel economy, abrasion resistance, wet performance, and handling stability.

DESCRIPTION OF EMBODIMENTS

The rubber composition for tires of the present invention contains a modified diene rubber containing a functional group reactive with silica, a fine particle silica having a nitrogen adsorption specific surface area of 180 m²/g or more, and a silane coupling agent of formula (1). In the present invention, by incorporating a specific silane coupling agent into a composition containing the above modified diene rubber and fine particle silica, it is possible to efficiently improve the balance of fuel economy, abrasion resistance, wet performance, and handling stability as compared to when the silane coupling agent is added to compositions containing conventional unmodified rubber and silica, thereby synergistically improving the balance of the properties which are usually difficult to simultaneously ensure.

In particular, unlike conventional silane coupling agents, the silane coupling agent of formula (1) is a compound that has a rigid cyclic structure between functional groups interacting with silica such as fine particle silica or polymers. Thus, the polymers and silica are properly spaced and fixed so that a balanced improvement in fuel economy and wet performance can be achieved. Therefore, the above property balance can be remarkably improved.

In the present invention, the rubber component includes a modified diene rubber containing a functional group reactive with silica (silica-reactive functional group). This improves fuel economy and other properties and remarkably improves the above property balance.

The silica-reactive functional group may be any group reactive with silica. In view of interaction with silica, particularly preferred are a silyl group, an amino group, an amide group, a hydroxy group, and an epoxy group. In order to improve the dispersibility of filler, the modified diene rubber preferably contains two or more silica-reactive functional groups. The functional group may be introduced into any site, e.g. the main chain or chain ends of the rubber. Alternatively, it may be located as a graft in a branched polymer chain.

Examples of the diene rubber forming the modified diene rubber include natural rubber (NR), epoxidized natural rubber (ENR), polyisoprene rubber (IR), polybutadiene rubber (BR), styrene-butadiene rubber (SBR), styrene-isoprene-butadiene rubber (SIBR), and other known polymers formed from conjugated diene monomers.

The modified diene rubber in the present invention may suitably be a modified SBR. This remarkably improves the above property balance. When modified SBR, or modified BR, which will be described later, is used, the rubber component itself often aggregates due to the strong interaction of the functional groups, thereby adversely resulting in difficulties in dispersing filler. The use of the silane coupling agent of formula (1) prevents the aggregation of the rubber component and promotes the interaction thereof with silica.

The SBR of the modified SBR is not particularly limited, and examples include solution-polymerized SBR (S-SBR) and emulsion-polymerized SBR (E-SBR). In order to improve the above property balance, S-SBR is preferred among these.

The modified SBR may be a known one, such as SBR with modified chain ends and/or modified main chain or modified SBR coupled with tin or silicon compounds or other compounds (e.g. condensates, those having a branched structure). Among these, it is most preferably a modified S-SBR containing the silica-reactive functional group due to its interaction with silica.

The modified SBR in the present invention may suitably be produced by a method including: step (a) of reacting a styrene-butadiene copolymer having an active alkali metal or alkaline-earth metal end obtained by polymerization of butadiene and styrene, with a first alkoxysilane compound that contains an alkoxysily group containing two or more alkoxy groups and a group protected by a deprotectable protecting group to obtain a modified styrene-butadiene copolymer containing an alkoxysilyl group; and step (b) of reacting the modified styrene-butadiene copolymer containing an alkoxysilyl group with a second alkoxysilane compound containing an alkoxysilyl group. This remarkably improves the above property balance.

The polymerization in step (a) may be carried out by known methods, such as by anionically polymerizing butadiene and styrene in an organic solvent inert to the reaction (e.g. hydrocarbon solvents such as aliphatic, alicyclic, or aromatic hydrocarbon compounds) using an alkali metal or alkaline-earth metal polymerization initiator such as a lithium compound, optionally in the presence of a randomizer, thereby obtaining a styrene-butadiene copolymer having an active alkali metal or alkaline-earth metal end.

Examples of the alkali metal or alkaline-earth metal polymerization initiator include organic lithium compounds such as alkyllithiums, lithium amide compounds such as lithium alkyleneimides, and other known ones.

The modification reaction in step (a) in which the first alkoxysilane compound is introduced into the active alkali metal or alkaline-earth metal end of the styrene-butadiene polymer may be carried out by known methods such as solution reaction.

When the styrene-butadiene copolymer having an active alkali metal or alkaline-earth metal end is reacted with the first alkoxysilane compound, the active alkali metal or alkaline-earth metal end moiety is bound to one of the two or more alkoxy groups to give a modified styrene-butadiene polymer containing the residue of the alkoxysilyl group.

In view of the reactivity with the styrene-butadiene copolymer having an active alkali metal or alkaline-earth metal end and the reactivity with the later-described second alkoxysilane compound, the alkoxysilyl group of the first alkoxysilane compound contains two or more alkoxy groups. Suitable examples of the alkoxy group include those containing C1-C20 alkyl or aryl groups.

The group protected by a deprotectable protecting group in the first alkoxysilane compound refers to a group protected from the active alkali metal or alkaline-earth metal end of the styrene-butadiene polymer. Examples include nitrogen-containing groups obtained by replacing two hydrogen atoms of primary amines with two protecting groups and nitrogen-containing groups obtained by replacing one hydrogen atom of secondary amines with one protecting group.

Specific examples of the first alkoxysilane compound include N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, bis[3-(triethoxysilyl)propyl]trimethylsilylamine, and bis[3-(trimethoxysilyl)propyl]trimethylsilylamine.

Step (b) includes reacting the modified styrene-butadiene copolymer containing an alkoxysilyl group obtained in step (a) with a second alkoxysilane compound containing an alkoxysilyl group.

The reaction between the second alkoxysilane compound and the modified styrene-butadiene copolymer containing an alkoxysilyl group may be carried out by known methods, such as by mixing them in the form of a solution.

Examples of the second alkoxysilane compound include compounds containing an alkoxysilyl group with a primary amino, secondary amino, tertiary amino, imino, pyridyl, primary phosphino, secondary phosphino, tertiary phosphino, epoxy, isocyanate, thioepoxy, hydroxyl, carboxyl, oxetane, thiol, or other groups; and compounds containing an alkoxysilyl group and an ethanolamine, benzimidazole, melamine, amidine, or other structures. The number of alkoxysilyl groups in the second alkoxysilane compound is one or more, and is preferably two or three, more preferably three, in view of reaction efficiency.

Specific examples of the second alkoxysilane compound include the first alkoxysilane compounds mentioned for step (a); trimethoxysilyl compounds such as 3-aminopropyltrimethoxysilane, 3-aminopropyltriethoxysilane, 3-mercaptomethyltrimethoxysilane, 3-mercaptomethyltriethoxysilane, 3-mercaptopropyltrimethoxysilane, 3-mercaptopropyltriethoxysilane, aminophenyltrimethoxysilane, aminophenyltriethoxysilane, 3-(N-methylamino)propyltrimethoxysilane, 3-(N-methylamino)propyltriethoxysilane, N-(2-aminoethyl)-3-aminopropyltrimethoxysilane, and 2-(6-aminohexyl)aminopropyltrimethoxysilane; and the corresponding triethoxysilyl compounds.

Step (b) may also be carried out in the presence of a metal element-containing condensation catalyst for alkoxysilane compounds (hereinafter, also referred to simply as "condensation catalyst").

The metal element-containing condensation catalyst for alkoxysilane compounds is preferably a metal compound containing at least one of the metal elements of the fourth, twelfth, thirteenth, fourteenth, and fifteenth groups of the periodic table. Suitable specific examples of the metal element include titanium, zirconium, aluminum, bismuth, and tin. The condensation catalyst promotes the condensation between the modified styrene-butadiene polymer and the second alkoxysilane compound.

Specific examples of the condensation catalyst include tetrakis(2-ethylhexyloxy)titanium, tetra(octanedioleate)titanium, tris(2-ethylhexanoate)bismuth, tetra n-propoxy zirconium, tetra n-butoxy zirconium, bis(2-ethylhexanoate)zirconium oxide, bis(oleate) zirconium oxide, tri-iso-propoxy aluminum, tri-sec-butoxy aluminum, tris(2-ethylhexanoate) aluminum, tris(stearate)aluminum, zirconium tetrakis(acetylacetonate), aluminum tris(acetylacetonate), bis(2-ethylhexanoate)tin, and di-n-octyltin bis(2-ethylhexylmaleate).

The styrene content of the modified SBR is preferably 5% by mass or more, more preferably 10% by mass or more, still more preferably 20% by mass or more. When the styrene content is less than 5% by mass, sufficient grip performance or rubber strength may not be obtained. The styrene content is also preferably 60% by mass or less, more preferably 50% by mass or less, still more preferably 40% by mass or less. When the styrene content is more than 60% by mass, excellent fuel economy may not be obtained. As used herein, the styrene content is calculated by $^1$H-NMR analysis.

The vinyl content of the modified SBR is preferably 10 mol % or more, more preferably 15 mol % or more, still more preferably 20 mol % or more. When the vinyl content is less than 10 mol %, sufficient grip performance or rubber strength may not be obtained. The vinyl content is also preferably 65 mol % or less, more preferably 60 mol % or less. When the vinyl content is more than 65 mol %, excellent fuel economy may not be obtained. As used herein, the vinyl content refers to the vinyl content of the butadiene portion and is calculated by $^1$H-NMR analysis.

In order to achieve excellent grip performance, the amount of SBR based on 100% by mass of the rubber component is preferably 10% by mass or more, more preferably 20% by mass or more, still more preferably 30% by mass or more. In view of abrasion resistance, the amount of SBR is also preferably 90% by mass or less, more preferably 80% by mass or less. When the modified SBR is incorporated, the amount thereof is suitably in the range as indicated above.

The SBR may be used alone, or two or more types with different styrene contents may be used in combination according to the intended use.

The rubber component in the present invention preferably includes BR in order to impart excellent abrasion resistance. Rubber compounds incorporating BR with silica usually show low dispersibility of filler such as silica and have difficulties in achieving desired properties. In the present invention, the incorporation of the silane coupling agent of formula (1) increases the interaction between silica and the rubber component. Thus, the dispersibility of filler is improved, and the balance of fuel economy, abrasion resistance, handling stability, and wet performance is synergistically improved.

The BR is preferably modified polybutadiene rubber, particularly a modified BR in which at least an alkoxysilane compound is bound to the active end of a butadiene polymer having a cis 1,4-content of 80% by mass or more.

The modified BR can be prepared by known methods. For example, it may be prepared by polymerizing butadiene in the presence of a polymerization catalyst to produce a butadiene polymer, and modifying the active end of the butadiene polymer with an alkoxysilane compound (hereinafter, also referred to as "modification reaction"). The cis 1,4-content can be adjusted to 80% by mass or more by performing the polymerization in the presence of a polymerization catalyst as described in WO 03/046020.

The alkoxysilane compound to be used for the modification of the active end of the butadiene polymer preferably contains two or more reactive groups including an alkoxysilyl group. The type of the reactive group(s) other than alkoxysilyl groups is not particularly limited, but is preferably, for example, a functional group such as an epoxy group, an isocyanate group, a carbonyl group, or a cyano group. The alkoxysilane compound may be a partial condensate or a mixture of the alkoxysilane compound and the partial condensate.

Suitable examples of the alkoxysilane compound include 3-glycidoxypropyltrimethoxysilane and 3-glycidoxypropyltriethoxysilane, and partial condensates thereof.

In the present invention, the BR is preferably a high-cis BR having a cis content of 90% by mass or more. In this case, excellent abrasion resistance can be obtained. The cis content is more preferably 97% by mass or more. The cis content can be calculated by, for example, infrared absorption spectrometry.

In order to achieve abrasion resistance, the amount of BR based on 100% by mass of the rubber component is preferably 5% by mass or more, more preferably 8% by mass or more, still more preferably 10% by mass or more. In view of processability, the amount of BR is also preferably 80% by mass or less, more preferably 75% by mass or less. When the modified BR is incorporated, the amount thereof is preferably in the range as indicated above.

A fine particle silica having a nitrogen adsorption specific surface area ($N_2SA$) of 180 $m^2/g$ or more is used in the present invention. Examples of the fine particle silica include dry silica (anhydrous silicic acid) and wet silica (hydrous silicic acid). Wet silica is preferred because it has a large number of silanol groups.

The fine particle silica has a nitrogen adsorption specific surface area ($N_2SA$) of 180 $m^2/g$ or more, preferably 190 $m^2/g$ or more, more preferably 200 $m^2/g$ or more. A $N_2SA$ of less than 180 $m^2/g$ tends to lead to a decrease in abrasion resistance. The $N_2SA$ of the silica is preferably 500 $m^2/g$ or less, more preferably 300 $m^2/g$ or less. A $N_2SA$ of more than 500 $m^2/g$ tends to lead to a decrease in low heat build-up properties or rubber processability. The nitrogen adsorption specific surface area of the silica is determined by the BET method in conformity with ASTM D3037-81.

The fine particle silica preferably has a cetyltrimethylammonium bromide (CTAB) specific surface area of 180 $m^2/g$ or more, more preferably 190 $m^2/g$ or more, still more preferably 195 $m^2/g$ or more, particularly preferably 197 $m^2/g$ or more. A CTAB specific surface area of less than 180 $m^2/g$ tends to lead to a decrease in abrasion resistance. The CTAB specific surface area is preferably 600 $m^2/g$ or less, more preferably 300 $m^2/g$ or less, still more preferably 250 $m^2/g$ or less. A silica having a CTAB specific surface area of more than 600 $m^2/g$ tends to have poor dispersibility and thus aggregate, resulting in reduction in processability, fuel economy, tensile strength, or flex crack growth resistance. The CTAB specific surface area is determined in conformity with ASTM D3765-92.

The fine particle silica preferably has an average primary particle size of 25 nm or less, more preferably 22 nm or less, still more preferably 17 nm or less, particularly preferably 14 nm or less. The lower limit of the average primary particle size is not particularly limited, but is preferably 3 nm or more, more preferably 5 nm or more, still more preferably 7 nm or more. In this case, fuel economy and other properties can be further improved. The average primary particle size of the fine particle silica can be determined by measuring at least 400 primary particles of the silica in the visual field by transmission or scanning electron microscopy and averaging the measurements.

The amount of the fine particle silica per 100 parts by mass of the rubber component is preferably 5 parts by mass or more, more preferably 10 parts by mass or more, still more preferably 15 parts by mass or more, particularly preferably 20 parts by mass or more. When the amount is less than 5 parts by mass, the low heat build-up properties may be insufficient. The amount is also preferably 200 parts by mass or less, more preferably 150 parts by mass or less, still more preferably 100 parts by mass or less. When the amount is more than 200 parts by mass, the filler is difficult to disperse in rubber so that rubber processability tends to deteriorate.

In the present invention, the fine particle silica may be used in combination with a second silica. In view of processability and fuel economy, the second silica to be used in combination with the fine particle silica desirably has a $N_2SA$ of less than 180 $m^2/g$.

The $N_2SA$ of the second silica is preferably 170 $m^2/g$ or less, more preferably 150 $m^2/g$ or less, still more preferably 130 $m^2/g$ or less, particularly preferably 120 $m^2/g$ or less. The $N_2SA$ is also preferably 50 $m^2/g$ or more, more preferably 80 $m^2/g$ or more, still more preferably 90 $m^2/g$ or more. When the $N_2SA$ is more than 180 $m^2/g$, the effect of the combination tends to be poor, while when the $N_2SA$ is less than 50 $m^2/g$, abrasion resistance tends to be poor.

The second silica preferably has a cetyltrimethylammonium bromide (CTAB) specific surface area of 150 $m^2/g$ or less, more preferably 140 $m^2/g$ or less, still more preferably 120 $m^2/g$ or less. When the CTAB specific surface area is more than 150 $m^2/g$, the effect of the combination tends to decrease. The CTAB specific surface area is preferably 70 $m^2/g$ or more, more preferably 80 $m^2/g$ or more, still more preferably 90 $m^2/g$ or more. When the CTAB specific surface area is less than 70 $m^2/g$, tensile strength or abrasion resistance tends to decrease.

The second silica preferably has an average primary particle size of 15 nm or more, more preferably 18 nm or more, still more preferably 20 nm or more, particularly preferably 22 nm or more, most preferably 24 nm or more. The average primary particle size is also preferably 30 nm or less. When the average primary particle size is less than 15 nm, the effect of the combination may be small, while when the average primary particle size is more than 30 nm, abrasion resistance may decrease.

The amount of the second silica per 100 parts by mass of the rubber component is preferably 5 parts by mass or more, more preferably 10 parts by mass or more, still more preferably 15 parts by mass or more, particularly preferably 20 parts by mass or more. When the amount is less than 5 parts by mass, the low heat build-up properties may be insufficient. The amount is also preferably 200 parts by mass or less, more preferably 150 parts by mass or less, still more preferably 100 parts by mass or less. When the amount is more than 200 parts by mass, the filler is difficult to disperse in rubber so that rubber processability tends to deteriorate.

When the fine particle silica and the second silica are used in combination, the combined amount thereof is suitably in the range as indicated above.

The rubber composition of the present invention preferably contains carbon black. Any carbon black can be used, including those commonly used in the tire industry, such as GPF, FEF, HAF, ISAF, and SAF. These carbon blacks may be used alone or in combinations of two or more.

The carbon black preferably has a nitrogen adsorption specific surface area ($N_2SA$) of 80 $m^2/g$ or more, more preferably 100 $m^2/g$ or more. When the $N_2SA$ is less than 80 $m^2/g$, weather resistance or antistatic performance may not be sufficiently improved. The $N_2SA$ of the carbon black is preferably 200 $m^2/g$ or less, more preferably 150 $m^2/g$ or less. When the $N_2SA$ is more than 200 $m^2/g$, processability tends to deteriorate. The nitrogen adsorption specific surface area of the carbon black is determined according to the A method specified in JIS K 6217.

The amount of the carbon black per 100 parts by mass of the rubber component is preferably 1 part by mass or more, more preferably 3 parts by mass or more. When the amount is less than 1 part by mass, the carbon black may not produce a sufficient improvement effect. The amount of the carbon black is also preferably 30 parts by mass or less, more preferably 10 parts by mass or less. When the amount is more than 30 parts by mass, fuel economy or processability tends to deteriorate.

The rubber composition of the present invention may incorporate aluminum hydroxide. This improves wet performance. The incorporation of aluminum hydroxide usually tends to lead to a decrease in abrasion resistance due to its weak interaction with the rubber component. However, the use of the silane coupling agent of formula (1) allows for improvement of wet performance while maintaining abrasion resistance.

The aluminum hydroxide preferably has an average primary particle size of 0.3 μm or more, more preferably 0.4 μm or more. With an average primary particle size of less than 0.3 μm, the aluminum hydroxide is difficult to disperse and thus abrasion resistance tends to decrease. The average primary particle size is also preferably 10 μm or less, more preferably 5 μm or less, still more preferably 3 μm or less. With an average primary particle size of more than 10 μm, the aluminum hydroxide may form fracture nuclei and thus abrasion resistance tends to decrease. In the present invention, the average primary particle size refers to a number average particle size as measured with a transmission electron microscope.

The amount of the aluminum hydroxide per 100 parts by mass of the rubber component is preferably 0.1 to 20 parts by mass. When the amount is less than 0.1 parts by mass, wet performance tends not to be sufficiently improved, while when the amount is more than 20 parts by mass, fuel economy may decrease.

A silane coupling agent (silylated core polysulfide silane) represented by the formula (1) below is used in the present invention.

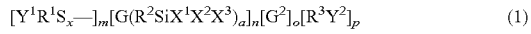  (1)

In the formula, each $G^1$ independently represents a C1-C30 polyvalent hydrocarbon group containing a polysulfide group, represented by $[(CH_2)_b—]_cR^4[—(CH_2)_dS_x—]_e$;

each $G^2$ independently represents a C1-C30 polyvalent hydrocarbon group containing a polysulfide group, represented by $[(CH_2)_b—]_cR^5[—(CH_2)_dS_x—]_e$;

each of $Y^1$ and $Y^2$ independently represents a silyl group represented by $—SiX^1X^2X^3$, a hydrogen atom, a carboxyl group, or an ester group represented by $—C(=O)OR^6$;

each $X^1$ independently represents —Cl, —Br, —OH, —$OR^6$, or $R^6C(=O)O—$;

each of $X^2$ and $X^3$ independently represents a hydrogen atom, $R^6$, $X^1$, or a —OSi-containing group formed by silanol condensation;

each of $R^1$ and $R^3$ independently represents a C1-C20 divalent hydrocarbon group;

each $R^2$ independently represents a linear hydrocarbon group represented by $—(CH_2)_f—$;

each $R^4$ independently represents a C1-C28 polyvalent hydrocarbon group or a heteroatom-containing C1-C27 polyvalent hydrocarbon group;

each $R^5$ independently represents a C1-C28 polyvalent hydrocarbon group;

$R^6$ represents a C1-C20 monovalent hydrocarbon group; and a, b, c, d, e, f, m, n, o, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, o represents a number of 0 to 10, and x represents a number of 1 to 10.

The present invention uses the compound of formula (1), and particularly a silylated core polysulfide in which multiple polysulfide chains are oriented in a noncollinear configuration, and the core contains multiple polysulfide groups that are attached to a primary carbon atom. Thus, even though the silane coupling agent contains a group having a high steric hindrance and therefore low reactivity, such as for example a cyclohexyl core, it shows improved reactivity so that the effects of the present invention can be well achieved.

Examples of the divalent hydrocarbon group as $R^1$ or $R^3$ include linear or branched alkylene, alkenylene, arylene, and aralkylene groups. $R^1$ and $R^3$ each preferably have 1 to 5 carbon atoms.

Examples of the polyvalent hydrocarbon group as $R^4$ include cyclic, branched, or linear alkyl, alkenyl, alkynyl, aryl, and aralkyl groups in which a+c+e−1 hydrogen atoms have been replaced. Examples of the heteroatom-containing polyvalent hydrocarbon group as $R^4$ include the above-mentioned polyvalent hydrocarbon groups but containing a heteroatom (e.g. a nitrogen atom, an oxygen atom, a sulfur atom, a phosphorus atom), such as cyclic, branched, or linear polyvalent aliphatic or aromatic hydrocarbon groups containing, for example, an ether group, a polysulfide group, a tertiary amine group, a cyano group, or a cyanurate ($C_3N_3$) group. $R^4$ preferably has 3 to 10 carbon atoms.

Examples of the polyvalent hydrocarbon group as $R^5$ include cyclic, branched, or linear alkyl, alkenyl, alkynyl, aryl, and aralkyl groups in which c+e−1 hydrogen atoms have been replaced. These polyvalent hydrocarbon groups each preferably have 1 to 27 carbon atoms. $R^5$ preferably has 3 to 10 carbon atoms.

Examples of the monovalent hydrocarbon group as $R^6$ include linear or branched alkyl, alkenyl, aryl, and aralkyl groups. $R^6$ preferably has 1 to 5 carbon atoms.

Examples of linear or branched alkyl groups include a methyl group, an ethyl group, a propyl group, and an isobutyl group; examples of linear or branched alkenyl groups include a vinyl group, a propenyl group, an allyl group, and a methallyl group; and examples of linear or branched alkynyl groups include an acetylenyl group, a propargyl group, and a methylacetylenyl group. Examples of aryl groups include a phenyl group and a naphthalenyl group; and examples of aralkyl groups include a benzyl group and a phenethyl group.

Examples of cyclic alkyl, alkenyl, and alkynyl groups include a norbornyl group, a norbornenyl group, an ethylnorbornyl group, an ethylnorbornenyl group, an ethylcyclohexyl group, an ethylcyclohexenyl group, a cyclohexylcyclohexyl group, and a cyclododecatrienyl group.

$Y^1$ and $Y^2$ are defined as above, and each preferably a silyl group represented by —$SiX^1X^2X^3$.

$X^1$ is defined as above, and preferably —OH or —$OR^6$.

Specific examples of $X^1$ include a methoxy group, an ethoxy group, a propoxy group, an isopropoxy group, a butoxy group, a phenoxy group, a benzyloxy group, a hydroxy group, a chloro group, and an acetoxy group.

$X^2$ and $X^3$ are defined as above, and each preferably a group as mentioned as $R^6$ or $X^1$ or a —OSi-containing group formed by silanol condensation.

Specific examples of $X^2$ and $X^3$ include a hydrogen atom, a methyl group, an ethyl group, a propyl group, an isopropyl group, a butyl group, a phenyl group, and the above specific examples of $X^1$.

Preferably, a is 1 to 2; b is 1 to 3; c is 1; d is 1 to 3; e is 1; f is 0 to 3; m is 1; n is 1 to 10; o is 0 to 1; p is 1; and x is 1 to 4.

Representative examples of tridentate (trivalent) C1-C30 polyvalent hydrocarbon groups for $G^1$ include —$CH_2$ $(CH_2)_{q+1}CH$ $(CH_2$—)- or —$CH(CH_3)(CH_2)_q CH(CH_2$—$)_2$- (in which q is a number of 0 to 20.); —$CH_2CH_2$ $(C_6H_4)CH$ $(CH_2$—)- or —$CH_2CH_2$ $(C_6H_3$—) $CH_2CH_2$— (in which $C_6H_4$ is a disubstituted benzene ring, and $C_6H_3$— is a trisubstituted ring.); and —$CH_2$ (CH—) $CH_2CH_2$—, —$CH_2$ (C—)($CH_3$) $CH_2CH_2$—, or —$CH_2CH(CH_3)(CH$—) $CH_2$—. Representative examples of other polyvalent groups include —$CH(CH_2$—)($CH_2)_q CH(CH_2$—)- (in which q is a number of 1 to 20.); —$CH_2(CH$—)($C_6H_4)CH(CH_2$—)- (in which $C_6H_4$ is a disubstituted benzene ring.); and —$CH_2$ (CH—) $CH_2OCH_2CH(CH_2$—)— or —$CH_2(CH$—)(CH—)$CH_2$—.

Representative examples of bidentate (divalent) C1-C30 polyvalent hydrocarbon groups for $G^2$ include —$CH_2$ $(CH_2)_{q+1}CH_2$ $(CH_2$—) or $CH_2$ $(CH_3)(CH_2)_q CH(CH_2$—$)_2$ (in which q is a number of 0 to 20.); —$CH_2CH_2$ $(C_6H_4)$ $CH_2CH_2$— (in which $C_6H_4$ is a disubstituted benzene ring.); and —$CH_2CH_2CH_2CH_2$—, —$CH_2$ (CH)($CH_3$) $CH_2CH_2$—, or —$CH_2CH(CH_3)$ $CH_2CH_2$—. Representative examples of other polyvalent groups include tridentate (trivalent) groups such as —$CH_2(CH_2)_{q+1}CH(CH_2$—)- (in which q is a number of 0 to 20.).

The silane coupling agent of formula (1) is preferably a compound represented by the following formula:

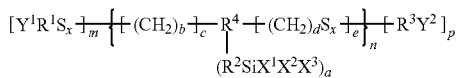

wherein each of $Y^1$ and $Y^2$ independently represents a silyl group represented by —$SiX^1X^2X^3$, a hydrogen atom, a carboxyl group, or an ester group represented by —C(=O)$OR^6$;

each $X^1$ independently represents —Cl, —Br, —OH, —$OR^6$, or $R^6C$(=O)O—;

each of $X^2$ and $X^3$ independently represents a hydrogen atom, $R^6$, $X^1$, or a —OSi-containing group formed by silanol condensation;

each of $R^1$ and $R^3$ independently represents a C1-C20 divalent hydrocarbon group;

each $R^2$ independently represents a linear hydrocarbon group represented by —$(CH_2)_f$—;

each $R^4$ independently represents a cyclic alkyl, alkenyl, alkynyl, aryl, or aralkyl group in which a+c+e−1 hydrogen atoms have been replaced;

$R^6$ represents a C1-C20 monovalent hydrocarbon group; and a, b, c, d, e, f, m, n, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, and x represents a number of 1 to 10.

Specific examples of the silane coupling agent of formula (1) include 4-(2-triethoxysilyl-1-ethyl)-1,2-bis-(13-triethoxysilyl-3,4,5,6-tetrathiatridecyl)cyclohexane; 4-(2-triethoxysilyl-1-ethyl)-1,2-bis-(13-triethoxysilyl-3,4,5,6-tetrathiatridecyl)cyclohexane; 4-(2-diethoxymethylsilyl-1-ethyl)-1,2-bis-(13-triethoxysilyl-3,4,5,6-tetrathiatridecyl) cyclohexane; 4-(2-triethoxysilyl-1-ethyl)-1,2-bis-(10-triethoxysilyl-3,4,5,6,7-pentathiadecyl)cyclohexane; 1-(2-triethoxysilyl-1-ethyl)-2,4-bis-(10-triethoxysilyl-3,4,5,6,7-pentathiadecyl)cyclohexane; 4-(2-triethoxysilyl-1-ethyl)-1,2-bis-(9-triethoxysilyl-3,4,5,6-tetrathianonyl)cyclohexane; 1-(2-triethoxysilyl-1-ethyl)-2,4-bis-(9-triethoxysilyl-3,4,5,6-tetrathianonyl)cyclohexane; 2-(2-triethoxysilyl-1-ethyl)-1,4-bis-(9-triethoxysilyl-3,4,5,6-tetrathianonyl)cyclohexane; 4-(2-triethoxysilyl-1-ethyl)-1,2-bis-(8-triethoxysilyl-3,4,5-trithiaoctyl)cyclohexane; 1-(2-triethoxysilyl-1-ethyl)-2,4-bis-(8-triethoxysilyl-3,4,5-trithiaoctyl)cyclohexane; 2-(2-triethoxysilyl-1-ethyl)-1,4-bis-(8-triethoxysilyl-3,4,5-trithiaoctyl)cyclohexane; 4-(2-triethoxysilyl-1-ethyl)-1,2-bis-(7-triethoxysilyl-3,4-dithiaheptyl)cyclohexane; 2-(2-triethoxysilyl-1-ethyl)-1,4-bis-(7-triethoxysilyl-3,4-dithiaheptyl)cyclohexane; 1-(2-triethoxysilyl-1-ethyl)-2,4-bis-(7-triethoxysilyl-3,4-dithiaheptyl)cyclohexane; 2-(2-triethoxysilyl-1-ethyl)-1-(7-triethoxysilyl-3,4-dithiaheptyl)-2-(8-triethoxysilyl-3,4,5-trithiaoctyl)-cyclohexane; 4-(2-triethoxysilyl-1-ethyl)-1,2-bis-(9-triethoxysilyl-3,4,5,6-tetrathianonyl)benzene; bis-[2-[4-(2-triethoxysilyl-1-ethyl)-2-(9-triethoxysilyl-3,4,5,6-tetrathianonyl)cyclohexyl]ethyl]tetrasulfide; bis-[2-[4-(2-triethoxysilyl-1-ethyl)-2-(9-triethoxysilyl-3,4,5,6-tetrathianonyl)cyclohexyl]ethyl]trisulfide; bis-[2-[4-(2-triethoxysilyl-1-ethyl)-2-(9-triethoxysilyl-3,4,5,6-tetrathianonyl)cyclohexyl]ethyl]disulfide; bis-[2-[4-(2-triethoxysilyl-1-ethyl)-2-(7-triethoxysilyl-3,4-dithiaheptyl)cyclohexyl]ethyl]disulfide; bis-[2-[4-(2-triethoxysilyl-1-ethyl)-2-(7-triethoxysilyl-3,4-dithiaheptyl)cyclohexyl]ethyl]trisulfide; bis-[2-[4-(2-triethoxysilyl-1-ethyl)-2-(7-triethoxysilyl-3,4-dithiaheptyl)cyclohexyl]ethyl]tetrasulfide; bis-[2-[4-(2-triethoxysilyl-1-ethyl)-2-(9-triethoxysilyl-3,4,5,6-tetrathianonyl)phenyl]ethyl]tetrasulfide; bis-[2-[4-(2-triethoxysilyl-1-ethyl)-3-bis-(9-triethoxysilyl-3,4,5,6-tetrathianonyl)cyclohexyl]ethyl]-trisulfide; bis[2-[4-(2-diethoxymethylsilyl-1-ethyl)-2-(7-triethoxysilyl-3,4-dithiaheptyl)cyclohexyl]ethyl]disulfide; and any isomer of the foregoing. These may be used alone or in combinations of two or more.

Preferred among these are (2-triethoxysilylethyl)-bis-(7-triethoxysilyl-3,4-dithiaheptyl)cyclohexane, (2-triethoxysilylethyl)-bis-(7-triethoxysilyl-3,4,5,6-tetrathianonyl)cyclohexane, and any isomer thereof.

The silane coupling agent of formula (1) may be produced by, for example, a method that includes: step (a) of reacting a hydrosilane represented by $HSi(X^1X^2X^3)$ (where $X^1$, $X^2$, and $X^3$ are defined as above) with a hydrocarbon containing a reactive double bond; step (b) of reacting a compound obtained in step (a) with a sulfurizing agent represented by $R^6C(\!=\!O)SH$ (where $R^6$ is defined as above) in the presence of a free radical agent; step (c) of deblocking the mercapto group using a proton donor; step (d) of reacting a mercaptan obtained in step (c) with a mixture of a base and sulfur; and step (e) of reacting a compound obtained in step (d) with a substituted or unsubstituted hydrocarbon containing a chlorine, bromine, or iodine leaving group.

The hydrocarbon containing a reactive double bond in step (a) may be, for example, a compound represented by the following formula:

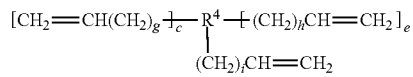

wherein $R^4$, c, and e are defined as above; g represents a number of 0 to 3; h represents a number of 0 to 3; and i represents a number of 0 to 3.

The free radical agent may be an oxidizing agent, for example, a compound that can convert a thiocarboxylic acid to a thiocarboxylic acid radical represented by the formula below. Oxygen, peroxides, hydroperoxides, and other similar substances may also be used.

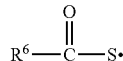

The proton donor may be any hydrogen-containing heterocarbon or substituted heterocarbon that is capable of reacting with a thiocarboxylic acid ester intermediate in step (c) to form a deblocked mercaptan. Examples include alcohols such as methanol, ethanol, isopropyl alcohol, and propanol; amines such as ammonia, methylamine, propylamine, and diethanolamine; and mercaptans such as propyl mercaptan and butyl mercaptan.

The substituted or unsubstituted hydrocarbon containing a leaving group may be a compound represented by $Y^1R^1Z$ or $Y^2R^3Z$ wherein $Y^1$, $Y^2$, $R^1$, and $R^3$ are defined as above, and each Z independently represents Cl, Br, or I.

The reactions may be carried out in the presence or absence of an organic solvent such as alcohol, ether, or hydrocarbon solvents. Examples of the organic solvent include ethanol, methanol, isopropyl alcohol, tetrahydrofuran, diethyl ether, hexane, cyclohexane, toluene, and xylene.

In the rubber composition of the present invention, the amount of the silane coupling agent of formula (1) per 100 parts by mass of silica is preferably 1.0 part by mass or more, more preferably 5.0 parts by mass or more, still more preferably 7.0 parts by mass or more. When the amount is less than 1.0 part by mass, the silane coupling agent may insufficiently react with filler, thereby failing to exert the excellent processability-improving effect. The amount is preferably 30 parts by mass or less, more preferably 20 parts by mass or less, still more preferably 15 parts by mass or less. An amount of more than 30 parts by mass may not further improve the effect of dispersing silica, which can be disadvantageous in cost.

The silane coupling agent of formula (1) may be used in combination with other silane coupling agents, preferably, for example, sulfide group-containing silane coupling agents (polysulfide silanes).

Examples of sulfide group-containing silane coupling agents include bis(3-triethoxysilylpropyl)tetrasulfide, bis(2-triethoxysilylethyl)tetrasulfide, bis(3-trimethoxysilylpropyl) tetrasulfide, bis(2-trimethoxysilylethyl)tetrasulfide, bis(3-triethoxysilylpropyl)trisulfide, bis(3-trimethoxysilylpropyl) trisulfide, bis(3-triethoxysilylpropyl)disulfide, bis(3-trimethoxysilylpropyl)disulfide, 3-trimethoxysilylpropyl-N, N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-triethoxysilylpropyl methacrylate monosulfide, and 3-trimethoxysilylpropyl methacrylate monosulfide. These coupling agents are commercially available generally as mixtures with certain distributions, and suitable examples include Si75 and Si69 both available from Evonik.

When other silane coupling agents are used in combination, the preferred range of the total amount of the silane coupling agents is as described above.

In the present invention, usually a vulcanizing agent and a vulcanization accelerator are incorporated. Any vulcanizing agent and vulcanization accelerator may be used, including those commonly used in the tire industry.

In order to well achieve the effects of the present invention, the vulcanizing agent is preferably sulfur, more preferably powdered sulfur, and may be a combination of sulfur with other vulcanizing agents. Examples of other vulcanizing agents include sulfur-containing vulcanizing agents such as Tackirol V200 available from Taoka Chemical Co., Ltd., DURALINK HTS (sodium hexamethylene-1,6-bisthiosulfate dihydrate) available from Flexsys, and KA9188 (1,6-bis(N,N'-dibenzylthiocarbamoyldithio)hexane) available from Lanxess; and organic peroxides such as dicumyl peroxide.

The amount of the vulcanizing agent per 100 parts by mass of the rubber component is preferably 0.1 parts by mass or more, more preferably 0.5 parts by mass or more, but preferably 15 parts by mass or less, more preferably 5 parts by mass or less. When the amount is within the range indicated above, the effects of the present invention can be well achieved, and good tensile strength, abrasion resistance, and heat resistance can also be obtained.

Preferred examples of the vulcanization accelerator are guanidines, sulfenamides, thiazoles, thiurams, dithiocarbamates, thioureas, and xanthates. Although these vulcanization accelerators may be used alone, two or more of these are desirably used in combination according to the intended use. In view of the balance between fuel economy and other rubber properties, it is desirable to use at least a guanidine vulcanization accelerator, among others.

Examples of the guanidine vulcanization accelerator include 1,3-diphenylguanidine, 1,3-di-ortho-tolylguanidine, 1-ortho-tolylbiguanide, di-ortho-tolylguanidine salts of dicatechol borate, 1,3-di-ortho-cumenylguanidine, 1,3-di-ortho-biphenylguanidine, and 1,3-di-ortho-cumenyl-2-propionylguanidine. Particularly preferred among these are 1,3-diphenylguanidine, 1,3-di-ortho-tolylguanidine, and 1-ortho-tolylbiguanide because of their high reactivity.

The amount of the vulcanization accelerator per 100 parts by mass of the rubber component is preferably 0.1 to 5 parts by mass, more preferably 0.2 to 4 parts by mass.

The rubber composition of the present invention preferably contains a plasticizer such as oil, liquid polymers, or liquid resins. This improves processability and enhances rubber strength. One or two or more of these plasticizers may be incorporated.

Among the above plasticizers, it is preferred to incorporate a liquid resin in order to simultaneously ensure fuel economy and abrasion resistance. Suitable examples of the liquid resin include those having a softening point close to room temperature, such as liquid coumarone-indene resins, liquid terpene resins, liquid styrene resins, and liquid C5 resins; and mixtures or modified products thereof. Liquid coumarone-indene resins are particularly preferred in view of the balance between fuel economy and abrasion resistance. From an environmental standpoint, it is preferred to incorporate no plasticizer including a polycyclic aromatic (PCA) component. The liquid resin preferably has a softening point of 0° C. or higher, more preferably a softening point of 5° C. to 40° C. The softening point of the liquid resin is determined as set forth in JIS K 6220-1:2001 with a ring and ball softening point measuring apparatus and is defined as the temperature at which the ball drops down.

The amount of the plasticizer per 100 parts by mass of the rubber component is preferably 2 parts by mass or more, more preferably 5 parts by mass or more. When the amount is less than 2 parts by mass, the effect of improving processability may be insufficient. The amount is also preferably 60 parts by mass or less, more preferably 50 parts by mass or less, still more preferably 40 parts by mass or less. When the amount is more than 60 parts by mass, the burden on the process may increase. In the case where the rubber component is oil extended, the amount of the plasticizer does not include the amount of the oil extender.

The rubber composition of the present invention preferably contains an antioxidant.

Any antioxidant usually used in rubber compositions, such as heat-resistant antioxidants and weather-resistant antioxidants, may be used. Examples include: amine antioxidants such as naphthylamine antioxidants (e.g. phenyl-α-naphthylamine), diphenylamine antioxidants (e.g. octylated diphenylamine, 4,4'-bis(α,α'-dimethylbenzyl)-diphenylamine), and p-phenylenediamine antioxidants (e.g. N-isopropyl-N'-phenyl-p-phenylenediamine, N-(1,3-dimethylbutyl)-N'-phenyl-p-phenylenediamine, N,N'-di-2-naphthyl-p-phenylenediamine); quinoline antioxidants such as 2,2,4-trimethyl-1,2-dihydroquinoline polymer; and phenolic antioxidants such as monophenolic antioxidants (e.g. 2,6-di-t-butyl-4-methyl phenol, styrenated phenols) and bis-, tris-, or polyphenolic antioxidants (e.g. tetrakis-[methylene-3-(3',5'-di-t-butyl-4'-hydroxyphenyl)-propionate] methane).

The amount of the antioxidant per 100 parts by mass of the rubber component is preferably 1 part by mass or more. When the amount is less than 1 part by mass, the effect of reducing molecular chain scission may be insufficient and thus abrasion resistance may decrease. The amount is also preferably 10 parts by mass or less. When the amount is more than 10 parts by mass, the antioxidant may bloom, causing discoloration.

In the present invention, a surfactant is preferably incorporated. This promotes dispersion of filler and can prevent discoloration due to degradation with time.

Non-limiting examples of the surfactant include metallic soaps such as metal salts of organic acids; and nonionic surfactants such as polyoxyalkylene derivatives. These surfactants may be used alone or in combinations of two or more.

Suitable examples of the metal salts of organic acids include metal salts of carboxylic acids.

Examples of the polyoxyalkylene derivatives include ether polyoxyalkylene derivatives such as polyoxyalkylene alkyl ethers; ester polyoxyalkylene derivatives such as polyoxyalkylene fatty acid esters; ether ester polyoxyalkylene derivatives such as polyoxyalkylene glycerol fatty acid esters; and nitrogen-containing polyoxyalkylene derivatives such as polyoxyalkylene fatty acid amides and polyoxyalkylene alkylamines.

Among the above surfactants, polyoxyalkylene alkyl ethers or polyoxyalkylene fatty acid esters are particularly preferred in view of the balance between fuel economy and other rubber properties.

The amount of the surfactant per 100 parts by mass of the rubber component is preferably 0.1 parts by mass or more, more preferably 0.3 parts by mass or more, still more preferably 0.6 parts by mass or more, particularly preferably 1 part by mass or more, most preferably 1.2 parts by mass or more. When the amount is less than 0.1 parts by mass, the effect of dispersing silica may not be sufficient. The amount is also preferably 5.0 parts by mass or less, more preferably 4.0 parts by mass or less, still more preferably 3.0 parts by mass or less. When the amount is more than 5.0 parts by mass, handling stability or other properties may deteriorate.

In addition to the above-described materials, the rubber composition of the present invention may appropriately contain various materials commonly used in the tire industry, such as zinc oxide, stearic acid, and wax.

The rubber composition of the present invention may be prepared by known methods, such as for example by kneading the components using a rubber kneading machine such as an open roll mill or a Banbury mixer, and vulcanizing the mixture.

The rubber composition is usually prepared by a method including: base kneading step 1 of kneading a rubber component, a filler including fine particle silica, a silane coupling agent, and other materials; final kneading step 2 of kneading a mixture obtained in base kneading step 1, a vulcanizing agent, and a vulcanization accelerator; and vulcanization step 3 of vulcanizing a mixture obtained in final kneading step 2.

Base kneading step 1 may be divided into, for example, first kneading step 1-1 and second base kneading step 1-2, as needed. The kneading in divided steps improves the dispersibility of silica. The fine particle silica is preferably kneaded in base kneading step 1 or in first base kneading step 1-1 in the case of kneading in divided steps.

The maximum temperature during the kneading in base kneading step 1 (e.g. base kneading steps 1-1 and 1-2) is not particularly limited, but is preferably 130° C. or higher, more preferably 140° C. or higher, still more preferably 145° C. or higher, in order to sufficiently react the silane coupling agent with silica to efficiently obtain a kneadate in which silica is well dispersed. Also, in order to prevent rubber scorch, the upper limit is preferably 200° C. or lower.

The kneading time in base kneading step 1 (e.g. base kneading steps 1-1 and 1-2) is not particularly limited. In order to efficiently obtain a kneadate in which silica is well dispersed, the kneading time in each step is preferably 3 minutes or longer, more preferably 4 minutes or longer, still more preferably 4.5 minutes or longer, but preferably 9 minutes or shorter, more preferably 8 minutes or shorter, still more preferably 7 minutes or shorter.

In particular, after the kneading temperature reaches 140° C. or higher in the final stage of base kneading step 1 (e.g. base kneading steps 1-1 and 1-2), the kneadate is preferably kept at 140° C. to 190° C. for 10 to 120 seconds. This allows the reaction between the silane coupling agent and silica to completely proceed.

The amount of the silane coupling agent to be introduced in base kneading step 1 (e.g. base kneading steps 1-1 and 1-2) per 100 parts by mass of silica introduced in each step is preferably 1.0 part by mass or more, more preferably 5.0 parts by mass or more, still more preferably 7.0 parts by mass or more. The amount of the silane coupling agent is also preferably 30 parts by mass or less, more preferably 20 parts by mass or less, still more preferably 15 parts by mass or less.

In the case where aluminum hydroxide is introduced, the amount of the silane coupling agent is preferably calculated per 100 parts by mass of the combined amount of the aluminum hydroxide and silica introduced.

In final kneading step 2, the kneadate obtained in base kneading step 1 is cooled and then kneaded with a vulcanization system such as a vulcanizing agent and a vulcanization accelerator to obtain an unvulcanized rubber composition. The kneadate obtained in step 1 is usually cooled at 100° C. or lower, preferably at 20° C. to 80° C.

The kneading temperature in final kneading step 2 is preferably 110° C. or lower, more preferably 100° C. or lower. When the temperature is higher than 110° C., rubber scorch may occur. The lower limit of the kneading temperature is not particularly limited, but is preferably 80° C. or higher.

The kneading time in final kneading step 2 is not particularly limited, but is usually 30 seconds or more, preferably 1 to 30 minutes.

Although the antioxidant may be divided into portions for each step and introduced in each step, the entire amount of the antioxidant is preferably introduced in final kneading step 2 in view of workability and from the standpoint of preventing the reduction in activity of the antioxidant during kneading.

In order to promote dispersion of silica, the surfactant is preferably introduced during the step of kneading silica, and especially during the step of kneading the fine particle silica. The surfactant may be divided into portions for multiple steps and introduced.

In vulcanization step 3, the unvulcanized rubber composition obtained in final kneading step 2 can be vulcanized by a known method to obtain a rubber composition of the present invention. The vulcanization temperature in vulcanization step 3 is preferably 120° C. or higher, more preferably 140° C. or higher, but preferably 200° C. or lower, more preferably 180° C. or lower, in order to well achieve the effects of the present invention.

The rubber composition of the present invention may be used for various tire components and especially suitable for treads and sidewalls, for example.

Tires formed from the rubber composition of the present invention can be produced using the rubber composition by usual methods. Specifically, the unvulcanized rubber composition containing various additives as needed is extruded into the shape of a tire component, e.g. a tread, and then assembled with other tire components in a conventional manner on a tire building machine to build an unvulcanized tire. The unvulcanized tire is heat pressed in a vulcanizer to produce a tire.

In the present invention, pneumatic or non-pneumatic tires can be produced from the rubber composition. Such pneumatic tires can be used, for example, for passenger vehicles, trucks and buses, or two-wheeled vehicles, or as high performance tires. As used herein, high performance tires refer to tires that are excellent particularly in grip performance, including racing tires for racing vehicles.

EXAMPLES

The present invention will be specifically described with reference to, but not limited to, examples below.

The chemicals used in the examples and comparative examples are listed below.

SBR 1: Buna SL4525-0 (styrene content: 25%, non-oil extended, unmodified S-SBR) available from Lanxess SBR 2: modified SBR (amino- and alkoxysilyl-containing modified S-SBR) prepared in Production Example 1 below BR 1: BR150B (cis content: 97% by mass, $ML_{1+4}$ (100° C.): 40) available from Ube Industries, Ltd.

BR 2: modified BR (alkoxysilyl-containing modified high-cis BR) prepared in Production Example 2 below Silica 1: Zeosil Premium 200MP (CTAB specific surface area: 200 $m^2/g$, BET specific surface area: 220 $m^2/g$, average primary particle size: 10 nm) available from Rhodia Silica 2: Zeosil 1115MP (CTAB specific surface area: 105 $m^2/g$, BET specific surface area: 115 $m^2/g$, average primary particle size: 25 nm) available from Rhodia Carbon black: Diablack N220 ($N_2SA$: 114 $m^2/g$, average primary particle size: 22 nm) available from Mitsubishi Chemical Corporation Oil: VIVATEC 500 available from H&R C10 resin: NOVARES C10 resin (liquid coumarone-indene resin, softening point: 10° C.) available from Rutgers Stearic acid: product of NOF Corporation Wax: Ozoace 0355 available from Nippon Seiro Co., Ltd.

Surfactant: EMULGEN 123P (nonionic surfactant, polyoxyethylene lauryl ether) available from Kao Corporation Silane coupling agent 1: (2-triethoxysilylethyl)-bis-(7-triethoxysilyl-3,4,5,6-tetrathianonyl)cyclohexane prepared in Production Example 3 below Silane coupling agent 2: Si69 available from Evonik Aluminum hydroxide: HIGILITE H-43 (average primary particle size: 1 μm) available from Showa Denko K.K.

Antioxidant: NOCRAC 6C (N-phenyl-N'-(1,3-dimethylbutyl)-p-phenylenediamine) available from Ouchi Shinko Chemical Industrial Co., Ltd.

Zinc oxide: zinc oxide #3 available from HakusuiTech Co., Ltd.

Sulfur: powdered sulfur available from Tsurumi Chemical Industry Co., Ltd.

Vulcanization accelerator 1: NOCCELER NS (N-t-butyl-2-benzothiazylsulfenamide) available from Ouchi Shinko Chemical Industrial Co., Ltd.

Vulcanization accelerator 2: NOCCELER D (N,N'-diphenylguanidine) available from Ouchi Shinko Chemical Industrial Co., Ltd.

Production Example 1

Preparation of Amino- and Alkoxysilyl-Containing SBR 2

A 5 L autoclave reactor was charged with 2,750 g of cyclohexane, 50 g of tetrahydrofuran, 125 g of styrene, and 375 g of butadiene in a nitrogen atmosphere. After the temperature inside the reactor was adjusted to 10° C., a cyclohexane solution containing 5.8 mmol of n-butyllithium was added to the reactor to initiate polymerization. The polymerization reaction was carried out for three hours at 50° C. to 80° C.

To the resulting polymer solution was added a cyclohexane solution containing 4.96 mmol of N,N-bis(triethylsilyl)-aminopropyltrimethoxysilane, and they were reacted for 15 minutes. The reacted polymer solution was mixed with a cyclohexane solution containing 4.96 mmol of 3-aminopropyltriethoxysilane for five minutes. Then, a cyclohexane solution containing 3.93 mmol of silicon tetrachloride was further added and mixed for five minutes. Subsequently, a cyclohexane solution containing 4.96 mmol of bis(2-ethylhexanoate) tin was added and mixed for five minutes. Next, to the resulting polymer solution was added 2.0 g of 2,6-di-tert-butyl-p-cresol. Then, the solvent was removed by steam stripping using hot water which had been adjusted to have a pH of 9 with sodium hydroxide, and the rubber was dried using a heating roll adjusted at 110° C. to obtain SBR 2.

The SBR 2 had a bound styrene content of 25% by mass, a vinyl content of 55 mol %, and a Mw of 620,000.

Production Example 2

Preparation of Alkoxysilyl-Containing BR 2

A 5 L autoclave was charged with 2.4 kg of cyclohexane and 300 g of 1,3-butadiene in a nitrogen atmosphere. Into the autoclave was charged a catalyst previously prepared by reacting 1,3-butadiene (4.5 mmol) with a solution of neodymium versatate (0.09 mmol) in cyclohexane, a solution of methylalumoxane (1.0 mmol) in toluene, and a solution of diisobutylaluminium hydride (3.5 mmol) and diethylaluminum chloride (0.18 mmol) in toluene at 50° C. for 30 minutes while aging. Then, a polymerization reaction was performed at 80° C. for 45 minutes.

Next, while maintaining the reaction temperature at 60° C., a solution of 3-glycidoxypropyltrimethoxysilane (4.5 mmol) in toluene was added and reacted for 30 minutes to modify the active ends. Thereto was added a methanol solution containing 1.5 g of 2,4-di-tert-butyl-p-cresol.

Subsequently, the modified polymer solution was added to 20 L of an aqueous solution adjusted to have a pH of 10 with sodium hydroxide, followed by removal of the solvent at 110° C. for two hours and drying using a roll at 110° C. to obtain BR 2. The BR 2 had a cis content of 97% by mass, a vinyl content of 1.1%, and a Mw of 350,000.

The molecular weight, styrene content, vinyl content, and cis content of the prepared polymers were analyzed as follows.
<Molecular Weight>
The weight average molecular weight (Mw) and number average molecular weight (Mn) were determined by gel permeation chromatography (GPC) under the following conditions (1) to (8).
(1) Apparatus: HLC-8220 available from Tosoh Corporation
(2) Separation column: HM-H (two in series) available from Tosoh Corporation
(3) Measurement temperature: 40° C.
(4) Carrier: tetrahydrofuran
(5) Flow rate: 0.6 mL/minute
(6) Injection amount: 5 µL
(7) Detector: differential refractometer
(8) Molecular weight standards: polystyrene standards <Identification of Polymer Structure>
The structure of the polymers was identified with a device of JNM-ECA series available from JEOL Ltd. The styrene content, vinyl content, and cis content were calculated from the results.

Production Example 3

Preparation of (2-triethoxysilylethyl)-bis-(7-triethoxysilyl-3,4,5,6-tetrathianonyl)cyclohexane First, (2-trimethoxysilylethyl)divinylcyclohexane was produced by hydrosilylation.

Specifically, a three-neck 5 L round bottom flask equipped with a magnetic stirrer bar, a temperature probe/controller, a heating mantle, an addition funnel, a condenser, and an air inlet was charged with 1,2,4-trivinylcyclohexane (2,001.1 g, 12.3 mol) and VCAT catalyst (1.96 g, 0.01534 g of platinum). Vinyl silane was added while bubbling air by means of the air inlet where a tube was below the surface of the silane. The reaction mixture was heated to 110° C., and trimethoxysilane (1,204 g, 9.9 mol) was added thereto over 3.5 hours. The temperature of the reaction mixture rose up to 130° C. The reaction mixture was cooled to room temperature, and 1,3,5-trimethyl-2,4,6-tris(3,5-di-tert-butyl-4-hydroxybenzyl)benzene (3 g, 0.004 mol) was added thereto. The resulting reaction mixture was distilled at 122° C. and 1 mmHg to give 1,427 g of (2-trimethoxysilylethyl)-divinylcyclohexane. The yield was 51 percent.

Next, (2-triethoxysilylethyl)divinylcyclohexane was produced by transesterification.

Specifically, a three-neck 3 L round bottom flask equipped with a magnetic stirrer bar, a temperature probe/controller, a heating mantle, an addition funnel, a distilling head, a condenser, and a nitrogen inlet was charged with (2-trimethoxysilylethyl)divinylcyclohexane (284 g, 2.33 mol), a solution of sodium ethoxide in ethanol (49 g of 21% sodium ethoxide, Aldrich Chemical), and ethanol (777 g, 16.9 mol). The reaction mixture was heated to remove methanol and ethanol by distillation under atmospheric pressure. The crude product was then distilled under reduced pressure at 106° C. and 0.4 mmHg to give 675 g of (2-triethoxysilylethyl)-divinylcyclohexane. The yield was 89 percent.

Subsequently, (2-triethoxysilylethyl)-bis-(3-thia-4-oxopentyl)cyclohexane was produced by adding thioacetic acid to the divinylsilane.

Specifically, a three-neck 1 L round bottom flask equipped with a magnetic stirrer bar, a temperature probe/controller, a heating mantle, an addition funnel, a condenser, a gas inlet, and a sodium hydroxide scrubber was charged with thioacetic acid (210 g, 2.71 mol). Thereto was slowly added (2-triethoxysilylethyl)divinylcyclohexane (400 g, 1.23 mol) over 30 minutes through the addition funnel at room temperature. The reaction was exothermic, and the temperature of the mixture rose to 94.6° C. The mixture was stirred for 2.5 hours and cooled to 38.8° C. Upon addition of additional thioacetic acid (10 g, 0.13 mol), a slight exothermic reaction was observed. The reaction mixture was stirred at 25° C. overnight (18 hours). An analysis revealed that the reaction mixture contained 2% or less of thioacetic acid and had an overall purity of 91%. The reaction mixture was further purified by distillation under reduced pressure with a Kugelrohr apparatus to obtain (2-triethoxysilylethyl)-bis-(3-thia-4-oxopentyl)cyclohexane.

Furthermore, a dimercaptosilane intermediate [(2-triethoxysilylethyl)bis(2-mercaptoethyl)cyclohexane] was produced by removing acetyl groups from (2-triethoxy-silylethyl)-bis-(3-thia-4-oxopentyl)cyclohexane.

Specifically, a three-neck 5 L round bottom flask equipped with a magnetic stirrer bar, a temperature probe/controller, a heating mantle, an addition funnel, a distilling head, a condenser, a 10-plate Oldershaw column, and a nitrogen inlet was charged with (2-triethoxysilylethyl)-bis-(3-thia-4-oxopentyl)cyclohexane (2,000 g, 4.1 mol), ethanol (546.8 g, 11.8 mol), and a solution of sodium ethoxide in ethanol (108 g of a 21% solution of sodium ethoxide in ethanol). The reaction mixture had a pH of about 8. The reaction mixture was heated at 88° C. for 24 hours to remove ethyl acetate and ethanol from the reaction mixture. To the resulting mixture was added 1 L of ethanol twice, and the pH of the reaction mixture was increased to about 10 by addition of 21 g of a 21% solution of sodium ethoxide in ethanol. The reaction mixture was further heated for 6.5 hours. The reaction mixture was cooled and then pressure filtered. The reaction mixture was stripped at 95° C. or lower under a pressure of 1 mmHg. The stripped product was filtered to obtain (2-triethoxysilylethyl)bis-(2-mercaptoethyl)cyclohexane (1,398 g, 3.5 mol, yield: 86%).

The target mixture of (2-triethoxysilylethyl)-bis-(7-triethoxysilyl-3,4,5,6-tetrathianonyl)cyclohexane, related oligomers and polysulfides, and bis-(triepoxysilylpropyl)polysulfide was prepared by reacting the dimercaptosilane with a base, sulfur, and 3-chloropropyltriethoxysilane.

Specifically, a three-neck 5 L round bottom flask equipped with a magnetic stirrer bar, a temperature probe/controller, a heating mantle, an addition funnel, a distilling head, a Friedrich condenser, and a nitrogen inlet was charged with (2-triethoxysilylethyl)-bis-(2-mercaptoethyl)cyclohexane (596.3 g, 1.5 mol). A 21% solution of sodium ethoxide in ethanol (979.0 g, 3.0 mol), ethanol (600 g), and sulfur (sublimed powder available from Aldorich Chemical, 299.0 g, 9.1 mol) were added with rapid stirring. The solution was refluxed overnight, and then 3-chloropropyltriethoxysilane (740.0 g, 3.07 mol) was added, followed by refluxing for 16 hours. The resulting solution was cooled and pressure filtered through a 0.1 micrometer filter. The filtrate was then stripped using a Rotavapor to remove ethanol. The target product including (2-triethoxysilylethyl)-bis-(7-triethoxysilyl-3,4,5,6-tetrathianonyl)cyclohexane (1,375 g) was analyzed by HPLC, NMR, and GC.

One isomer of (2-triethoxysilylethyl)-bis-(7-triethoxysilyl-3,4,5,6-tetrathianonyl)cyclohexane has the following structure.

[Examples, Comparative Examples] (Table 1)

The chemicals listed in the Base kneading step 1-1 section in Table 1 in the shown amounts were introduced and kneaded in a Banbury mixer for five minutes at a discharge temperature set at 150° C. Then, the kneadate was maintained in the mixer for one minute so that the discharge temperature reached about 160° C.

Next, the chemicals listed in the Base kneading step 1-2 section in Table 1 in the shown amounts were introduced to the kneadate obtained in base kneading step 1-1 and they were kneaded at 140° C. or higher for 30 seconds, followed by kneading for three minutes so that the discharge temperature reached about 150° C.

Then, to the kneadate obtained in base kneading step 1-2 were added the chemicals listed in the Final kneading step 2 section in Table 1 in the shown amounts, and they were kneaded using an open roll mill at about 80° C. for three minutes to obtain an unvulcanized rubber composition.

The unvulcanized rubber composition was formed into the shape of a tread and assembled with other tire components on a tire building machine, followed by vulcanization at 150° C. and 25 kgf for 35 minutes to prepare a test tire (tire size: 195/65R15).

[Example, Comparative Example] (Table 2)

A test tire was prepared as described above, except that kneading was not carried out in the divided base kneading steps 1-1 and 1-2 but was performed through base kneading step 1 in which the chemicals listed in Table 2 in the shown amounts were introduced at one time, and kneading was conducted for five minutes so that the discharge temperature reached 150° C.

[Evaluation]

The test tires prepared as above were evaluated as follows. Tables 1 and 2 show the results.

<Rolling Resistance>

The rolling resistance of each test tire was measured using a rolling resistance tester by running the test tire mounted on a 15×6 JJ rim at an internal pressure of 230 kPa, a load of 3.43 kN, and a speed of 80 km/h. The rolling resistances are expressed as an index, with Comparative Example 1 set equal to 100. A higher index indicates a better result, i.e. better fuel economy.

<Abrasion Resistance>

Each set of test tires was mounted on a front-engine, front-wheel-drive car made in Japan. After a mileage of 8,000 km, the groove depth in the tire tread portion was measured. The distance at which the tire groove depth decreased by 1 mm was calculated and expressed as an index using the equation below. A higher index indicates better abrasion resistance.

(Abrasion resistance index)=(Distance at which groove depth of each formulation example decreased by 1 mm)/(Distance at which tire groove depth of Comparative Example 1 decreased by 1 mm)×100

<Handling Stability>

Each set of test tires was mounted on a front-engine, front-wheel-drive car made in Japan. A test driver drove the car in a zig-zag fashion and subjectively evaluated the handling stability. The handling stability of the test tires was evaluated relative to that of Comparative Example 1, which was assigned a score of 100. A higher score indicates better handling stability.

<Wet Performance>

The braking distance of the test tires from an initial speed of 100 km/h under wet asphalt road conditions was determined and expressed as an index using the equation below. A higher index indicates better wet performance.

(Wet performance index)=(Braking distance of Comparative Example 1)/(Braking distance of each formulation example)×100

TABLE 1

|  |  |  | Example | | | | Comparative Example | | |
| --- | --- | --- | --- | --- | --- | --- | --- | --- | --- |
|  |  |  | 1 | 2 | 3 | 4 | 1 | 2 | 3 |
| Formulation (parts by mass) | SBR 1 | Base kneading step 1-1 | — | — | — | — | 70 | 70 | — |
|  | SBR 2 |  | 70 | 70 | 70 | 70 | — | — | 70 |
|  | BR 1 |  | 30 | — | — | — | 30 | 30 | — |
|  | BR 2 |  | — | 30 | 30 | 30 | — | — | 30 |
|  | Silica 1 |  | 30 | 30 | 30 | 30 | — | 30 | 30 |
|  | Silica 2 |  | — | — | — | — | 30 | — | — |
|  | Carbon black |  | 5 | 5 | 5 | 5 | 5 | 5 | 5 |
|  | Oil |  | 10 | 10 | — | — | 10 | 10 | 10 |
|  | C10 resin |  | — | — | 10 | 10 | — | — | — |
|  | Stearic acid |  | 2 | 2 | 2 | 2 | 2 | 2 | 2 |
|  | Wax |  | 2 | 2 | 2 | 2 | 2 | 2 | 2 |
|  | Surfactant |  | — | — | 1 | 1 | 1 | 1 | 1 |
|  | Vulcanization accelerator 2 |  | — | — | 1 | 1 | 1 | 1 | 1 |
|  | Silane coupling agent 1 |  | 3 | 3 | 3 | 3 | — | 3 | — |
|  | Silane coupling agent 2 |  | — | — | — | — | 3 | — | 3 |
|  | Silica 2 | Base kneading step 1-2 | 15 | 15 | 15 | 15 | 15 | 15 | 15 |
|  | Aluminum hydroxide |  | — | — | — | 10 | — | — | — |
|  | Silane coupling agent 1 |  | 1.2 | 1.2 | 1.2 | 1.8 | — | 1.2 | — |
|  | Silane coupling agent 2 |  | — | — | — | — | 1.2 | — | 1.2 |
|  | Antioxidant |  | 2 | 2 | 2 | 2 | 2 | 2 | 2 |
|  | Zinc oxide |  | 2 | 2 | 2 | 2 | 2 | 2 | 2 |
|  | Sulfur | Final kneading step 2 | 1.5 | 1.5 | 1.5 | 1.5 | 1.5 | 1.5 | 1.5 |
|  | Vulcanization accelerator 1 |  | 1.5 | 1.5 | 1.5 | 1.5 | 1.5 | 1.5 | 1.5 |
|  | Vulcanization accelerator 2 |  | 1.5 | 1.5 | 0.5 | 0.5 | 1.5 | 1.5 | 1.5 |
| Evaluation | Fuel economy index |  | 110 | 112 | 116 | 105 | 100 | 98 | 96 |
|  | Abrasion resistance index |  | 109 | 113 | 120 | 108 | 100 | 103 | 101 |
|  | Wet performance index |  | 102 | 103 | 105 | 114 | 100 | 100 | 98 |
|  | Handling stability |  | 103 | 105 | 110 | 108 | 100 | 97 | 94 |

TABLE 2

|  |  |  | Example 5 | Comparative Example 4 |
| --- | --- | --- | --- | --- |
| Formulation (parts by mass) | SBR 1 | Base kneading step 1 | — | — |
|  | SBR 2 |  | 70 | 70 |
|  | BR 1 |  | 30 | 30 |
|  | BR 2 |  | — | — |
|  | Silica 1 |  | 30 | 30 |
|  | Silica 2 |  | 15 | 15 |
|  | Carbon black |  | 5 | 5 |
|  | Oil |  | 10 | 10 |
|  | C10 resin |  | — | — |
|  | Stearic acid |  | 2 | 2 |
|  | Wax |  | 2 | 2 |
|  | Surfactant |  | — | — |
|  | Vulcanization accelerator 2 |  | — | — |
|  | Silane coupling agent 1 |  | 4.2 | — |
|  | Silane coupling agent 2 |  | — | 4.2 |
|  | Sulfur | Final kneading step 2 | 1.5 | 1.5 |
|  | Vulcanization accelerator 1 |  | 1.5 | 1.5 |
|  | Vulcanization accelerator 2 |  | 1.5 | 1.5 |
| Evaluation | Fuel economy index |  | 103 | 99 |
|  | Abrasion resistance index |  | 106 | 97 |
|  | Wet performance index |  | 101 | 100 |
|  | Handling stability |  | 102 | 100 |

The results in Tables 1 and 2 show that the balance of fuel economy, abrasion resistance, wet performance, and handling stability was remarkably improved by the use of a modified diene rubber, fine particle silica, and a silane coupling agent of formula (1). In particular, it is demonstrated that the level of properties achieved was almost the same among Comparative Example 1 in which an unmodified rubber, conventional silica, and a silane coupling agent were used, Comparative Example 2 in which the silica and silane coupling agent were replaced with fine particle silica and a silane coupling agent of formula (1), and Comparative Example 3 in which the rubber and silica were replaced with a modified diene rubber and fine particle silica; in contrast, the properties were remarkably improved and the above property balance was synergistically improved in Example 3 in which a modified diene rubber, fine particle silica, and a silane coupling agent of formula (1) were used in combination. Moreover, good properties were obtained when the base kneading step was divided into base kneading steps 1-1 and 1-2.

[Comparative Example] (Table 3)

Furthermore, test tires with the general rubber/silica compounds shown in Table 3 were prepared as in the example and comparative example of Table 2. The test tires were evaluated as described above, and the results (Standard: Comparative Example 6) are shown.

TABLE 3

|  |  |  | Comparative Example | |
|---|---|---|---|---|
|  |  |  | 5 | 6 |
| Formulation (parts by mass) | SBR 1 | Base kneading step 1 | 70 | 70 |
|  | BR 1 |  | 30 | 30 |
|  | Silica 2 |  | 45 | 45 |
|  | Carbon black |  | 5 | 5 |
|  | Oil |  | 5 | 5 |
|  | C10 resin |  | — | — |
|  | Stearic acid |  | 2 | 2 |
|  | Wax |  | 2 | 2 |
|  | Silane coupling agent 1 |  | 6.5 | — |
|  | Silane coupling agent 2 |  | — | 6.5 |
|  | Sulfur | Final kneading step 2 | 1 | 1 |
|  | Vulcanization accelerator 1 |  | 2 | 2 |
|  | Vulcanization accelerator 2 |  | 2 | 2 |
| Evaluation | Fuel economy index |  | 103 | 100 |
|  | Abrasion resistance index |  | 99 | 100 |
|  | Wet performance index |  | 101 | 100 |
|  | Handling stability |  | 101 | 100 |

As compared with the modified diene rubber/fine particle silica compound shown in Table 2, the general rubber/silica compounds shown in Table 3 exhibited only a small improvement in the above property balance, even when a silane coupling agent of formula (1) was added. The above property balance was synergistically improved by adding a silane coupling agent of formula (1) to a modified diene rubber and fine particle silica.

The invention claimed is:

1. A rubber composition for tires, comprising:
   a modified diene rubber containing a functional group reactive with silica;
   a fine particle silica having a nitrogen adsorption specific surface area of 180 m²/g or more and a cetyltrimethylammonium bromide specific surface area of 180 m²/g or more; and
   a silane coupling agent represented by the following formula (1):

[Y¹R¹S$_x$—]$_m$[G¹(R²SiX¹X²X³)$_a$]$_n$[G²]$_o$[R³Y²]$_p$  (1)

wherein each G¹ independently represents a C1-C30 polyvalent hydrocarbon group containing a polysulfide group, represented by [(CH₂)$_b$—]$_c$R⁴[—(CH₂)$_d$S$_x$—]$_e$;
   each G² independently represents a C1-C30 polyvalent hydrocarbon group containing a polysulfide group, represented by [(CH₂)$_b$—]$_c$R⁵[—(CH₂)$_d$S$_x$—]$_e$;
   each of Y¹ and Y² independently represents a silyl group represented by —SiX¹X²X³, a hydrogen atom, a carboxyl group, or an ester group represented by —C(=O)OR⁶;
   each X¹ independently represents —Cl, —Br, —OH, —OR⁶, or R⁶C(=O)O—;
   each of X² and X³ independently represents a hydrogen atom, R⁶, X¹, or a —OSi— containing group formed by silanol condensation;
   each of R¹ and R³ independently represents a C1-C20 divalent hydrocarbon group;
   each R² independently represents a linear hydrocarbon group represented by —(CH₂)$_f$—;
   each R⁴ independently represents a C1-C28 polyvalent hydrocarbon group or a heteroatom-containing C1-C27 polyvalent hydrocarbon group;
   each R⁵ independently represents a C1-C28 polyvalent hydrocarbon group;
   R⁶ represents a C1-C20 monovalent hydrocarbon group; and
   a, b, c, d, e, f, m, n, o, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, o represents a number of 0 to 10, and x represents a number of 1 to 10,
   wherein the modified diene rubber containing a functional group reactive with silica contains at least two selected from the group consisting of a silyl group, an amino group, an amide group, a hydroxy group, and an epoxy group.

2. The rubber composition for tires according to claim 1, wherein the fine particle silica is present in an amount of 5 parts by mass or more per 100 parts by mass of a rubber component in the rubber composition.

3. The rubber composition for tires according to claim 1, wherein the silane coupling agent of formula (1) is a compound represented by the following formula:

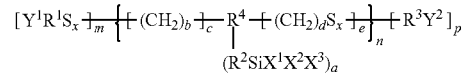

wherein each of Y¹ and Y² independently represents a silyl group represented by —SiX¹X²X³, a hydrogen atom, a carboxyl group, or an ester group represented by —C(=O)OR⁶;
each X¹ independently represents —Cl, —Br, —OH, —OR⁶, or R⁶C(=O)O—;
each of X² and X³ independently represents a hydrogen atom, R⁶, X¹, or a —OSi— containing group formed by silanol condensation;
each of R¹ and R³ independently represents a C1-C20 divalent hydrocarbon group;
each R² independently represents a linear hydrocarbon group represented by —(CH₂)$_f$—;
each R⁴ independently represents a cyclic alkyl, alkenyl, alkynyl, aryl, or aralkyl group in which a+c+e−1 hydrogen atoms have been replaced;
R⁶ represents a C1-C20 monovalent hydrocarbon group; and
a, b, c, d, e, f, m, n, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, and x represents a number of 1 to 10.

4. The rubber composition for tires according to claim 1, further comprising at least one selected from the group consisting of surfactants, liquid coumaroneindene resins, and aluminum hydroxide.

5. A pneumatic tire, formed from the rubber composition according to claim 1.

6. A pneumatic tire, formed from the rubber composition according to claim 2.

7. A pneumatic tire, formed from the rubber composition according to claim 3.

8. The rubber composition for tires according to claim 3, wherein the fine particle silica is present in an amount of 5 parts by mass or more per 100 parts by mass of a rubber component in the rubber composition.

9. A pneumatic tire, formed from the rubber composition according to claim 8.

* * * * *